US008215895B2

(12) United States Patent
Henry et al.

(10) Patent No.: US 8,215,895 B2
(45) Date of Patent: Jul. 10, 2012

(54) VAPOR PHASE LUBRICATION SYSTEM

(75) Inventors: Mark S. Henry, Indianapolis, IN (US);
Daniel Kent Vetters, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 1162 days.

(21) Appl. No.: 12/041,034

(22) Filed: Mar. 3, 2008

(65) Prior Publication Data
US 2009/0220330 A1    Sep. 3, 2009

(51) Int. Cl.
*F04D 27/02* (2006.01)
(52) U.S. Cl. ............ 415/1; 415/111; 415/116; 415/175; 415/180
(58) Field of Classification Search .................. 184/6.11, 184/6.21, 6.22, 6.26; 384/468; 415/110, 415/111, 116, 175, 176, 180, 229, 1
See application file for complete search history.

(56) References Cited

U.S. PATENT DOCUMENTS

| | | | | |
|---|---|---|---|---|
| 2,406,947 A * | 9/1946 | Harlamoff | ..................... | 415/111 |
| 2,440,980 A * | 5/1948 | Sheppard | ..................... | 415/110 |
| 2,492,672 A * | 12/1949 | Wood | ............................ | 417/372 |
| 2,709,567 A * | 5/1955 | Wood | ............................ | 415/115 |
| 2,919,148 A * | 12/1959 | Smith | ........................... | 384/482 |
| RE25,227 E * | 8/1962 | Buck | ............................. | 415/176 |
| 3,147,913 A * | 9/1964 | Davies et al. | ................. | 415/176 |
| 3,186,513 A * | 6/1965 | Dunn et al. | ................... | 184/109 |
| 3,527,054 A * | 9/1970 | Hemsworth | .................. | 60/39.08 |
| 3,734,639 A * | 5/1973 | Short | ............................ | 415/114 |
| 3,955,359 A * | 5/1976 | Yannone et al. | ........... | 60/39.281 |
| 4,190,398 A * | 2/1980 | Corsmeier et al. | ............. | 415/114 |
| 4,451,200 A * | 5/1984 | Libertini et al. | ............... | 415/110 |
| 4,465,427 A * | 8/1984 | Libertini et al. | ................... | 415/1 |
| 4,502,274 A * | 3/1985 | Girault | .......................... | 60/39.08 |
| 4,542,623 A * | 9/1985 | Hovan et al. | .................. | 60/226.1 |
| 4,561,246 A * | 12/1985 | Hovan | .......................... | 60/226.1 |
| 5,163,757 A | 11/1992 | Graham | | |
| 5,327,998 A * | 7/1994 | Rosado et al. | ................ | 184/55.1 |
| 5,351,786 A * | 10/1994 | Graham et al. | ............... | 184/6.22 |
| 5,498,352 A * | 3/1996 | Graham et al. | ............... | 508/419 |
| 5,498,354 A | 3/1996 | Graham et al. | | |

(Continued)

OTHER PUBLICATIONS

Van Treuren, K.W., Investigation of Vapor-Phase Lubrication in a Gas Turbine Engine, Journal of Engineering for Gas Turbines and Power; vol. 120; Issue:2; 42. international gas turbine and aeroengine congress and exhibition, Orlando, FL (United States), Jun. 2-5, 1997; PPD Apr. 1998.

*Primary Examiner* — Edward Look
*Assistant Examiner* — Adam Benson
(74) *Attorney, Agent, or Firm* — Krieg DeVault LLP

(57) ABSTRACT

Embodiments of the present invention include a method and system for carrying out vapor-phase lubrication of a component, such as a bearing for example. The method and apparatus can be applied to a turbine engine. The method includes the step of directing a first stream of fluid containing atomized lubricant to the component at a first velocity. The system provides a first fluid injection system configured to perform the first step. The method also includes the step of directing a second stream of fluid at a second velocity less than the first velocity to the component. The second stream is for controlling a temperature of the component. The system provides a second fluid injection system configured to perform the second step. Both of the directing steps are carried out concurrently.

20 Claims, 6 Drawing Sheets

U.S. PATENT DOCUMENTS

| | | | | |
|---|---|---|---|---|
| 5,593,165 | A * | 1/1997 | Murray et al. | 277/543 |
| 5,636,708 | A * | 6/1997 | Wedeven et al. | 184/6.22 |
| 6,640,933 | B2 * | 11/2003 | Henry et al. | 184/5.1 |
| 7,174,997 | B2 * | 2/2007 | Sheridan | 184/6.26 |
| 7,926,291 | B1 * | 4/2011 | Wilson, Jr. | 60/805 |
| 2008/0035786 | A1 * | 2/2008 | Bilyk et al. | 244/13 |
| 2009/0252604 | A1 * | 10/2009 | Alexander et al. | 415/180 |

* cited by examiner

VAPOR PHASE LUBRICATION SYSTEM

STATEMENT REGARDING FEDERALLY SPONSORED RESEARCH OR DEVELOPMENT

The present invention was made under U.S. Government Contract Number N00014-04-D-0068 awarded by the Department of Defense, and the Department of Defense may have certain rights in the present invention.

BACKGROUND OF THE INVENTION

1. Field of the Invention

The invention relates to a lubrication system for a component and more particularly to a vapor-phase lubrication system.

2. Description of Related Prior Art

Lubrication systems supply lubricant to bearings, gears and other components that require lubrication. The lubricant cools the components and protects them from wear. Vapor-phase lubrication is one methodology for lubricating a component. In vapor-phase lubrication, lubricant in liquid or vapor form is delivered to a component and, upon contact with the component, reacts to form a solid film. Vapor phase lubrication can be an appropriate for lubrication when the operating temperature of the component to be lubricated is relatively high. For example, the temperature may too high for a lubricant in liquid form to be effective.

SUMMARY OF THE INVENTION

In summary, the invention is a method and system for carrying out vapor-phase lubrication of a component such as a bearing, for example. The method and system can be applied to a turbine engine. The method includes the step of directing a first stream of fluid containing atomized lubricant to the component at a first velocity. The system provides a first fluid injection system for performing the first step. The system also provides a lubricant injection system communicating with the first fluid injection system upstream of the sump cavity. The lubricant injection system is operable to atomize lubricant in the first stream. The method also includes the step of directing a second stream of fluid at a second velocity less than the first velocity to the component. The second stream is for controlling a temperature of the component. The system provides a second fluid injection system for performing the second step. Both of the directing steps are carried out concurrently.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

Figure 1:
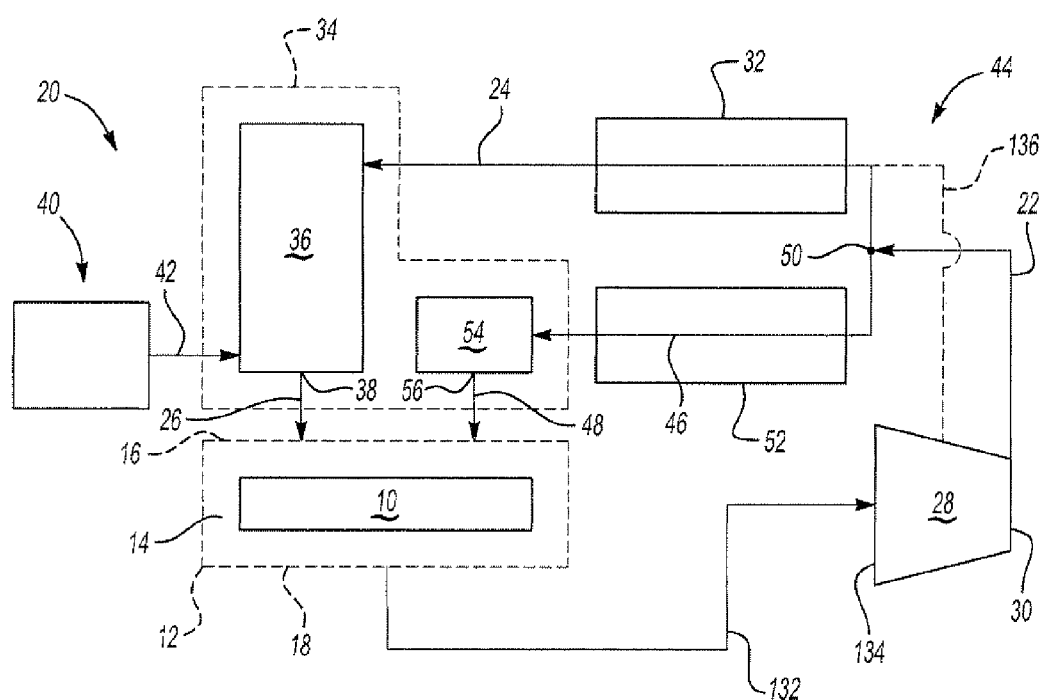
FIG. 1 is a schematic representation of a first exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

The invention provides a method and system for carrying out vapor-phase lubrication of a component such as a bearing, for example. The broader invention, including the embodiments disclosed herein, can be applied to lubricate other components such as gears, cams, cam followers, or any other structure to be lubricated. The method and apparatus can be applied to, or incorporated in, a turbine engine. The method and apparatus can also be applied to any machine having components to be lubricated.

FIG. 1 is a schematic representation of a first exemplary embodiment of the invention and FIGS. 2-6 are detailed views of the first exemplary embodiment. Generally, as shown in FIG. 1, a component 10 to be lubricated can be disposed in a sump 12. The sump 12 can define a sump cavity 14 operable to at least partially enclose the component 10. The sump cavity can extend between a first end 16 and a second end 18.

A first fluid injection system 20 call be disposed to inject a first stream of fluid at a first velocity into the first end 16 of the sump cavity 14. The arrows 22, 24, 26 represent the flow of the first stream of fluid. The arrow 22 represents the flow of the first stream of fluid from a source 28 of fluid and the arrow 26 represents the flow of the first stream of fluid into the sump cavity 14. FIG. 1 is schematic and therefore does not show any particular piping; the invention can be practiced with any particular piping, conduits, ductwork, or other structures operable for directing the first stream of fluid from the source 28 to the sump cavity 14. The source 28 of fluid can generate pressurized fluid. For example, the source 28 can be a multi-stage compressor and the first stream of fluid can be pressurized air drawn from an outlet 30 of the multi-stage compressor 28. The exemplary first stream of fluid can be directed by the first fluid injection system 20 along the direction of arrow 22 and also along the direction of arrow 24 after exiting the multi-stage compressor 28.

A heat exchanger 32 can be positioned along the portion of the first fluid injection system 20 represented by arrow 24. The heat exchanger 32 can extract heat from the first stream of fluid in the exemplary embodiment of the invention. However, in alternative embodiments, the heat exchanger 34 can be utilized to transfer heat to the first stream of fluid. The basis for utilization of the heat exchanger 32 in the exemplary embodiment of the invention will be described in greater detail below.

The first fluid injection system 20 can include a distribution manifold 34. The first stream of fluid can be directed to a first fluid passageway 36 of the distribution manifold 34 from the portion of the first fluid injection system 20 represented by the arrow 24. The first stream of fluid can exit the first fluid passageway 36 at a first outlet 38 and enter the sump cavity 14.

A lubricant injection system 40 can communicate with the first fluid injection system 20 upstream of the first end 16 of the sump cavity 14. The lubricant injection system 40 can be operable to atomize lubricant in the first stream of fluid. In other words, the lubricant injection system 40 can be operable to reduce lubricant in liquid form to fine particles or spray. The fine particles are lubricant in liquid form. The addition of lubricant to the first stream of fluid is represented by arrow 42. Thus, the first stream of fluid contains atomized lubricant during movement along the portion of the first fluid injection system 20 represented by the arrow 26. The first stream of fluid can therefore deliver lubricant to the component 10.

A second fluid injection system 44 can inject a second stream of fluid into the sump cavity at a second velocity less than the first velocity. The arrows 22, 46, 48 represent the flow of the second stream of fluid. The arrow 22 represents the flow of the second stream of fluid from the source 28 of fluid and the arrow 48 represents the flow of the second stream of fluid into the sump cavity 14. FIG. 1 is schematic and therefore does not show any particular piping; the invention can be practiced with any particular piping operable for directing the second stream of fluid from the source 28 to the sump cavity 14. The first and second fluid injection systems 20, 44 can be operable to inject the respective first and second streams concurrently.

As set forth above, in the exemplary embodiment of the invention, the source 28 of fluid can be a multi-stage compressor. Thus, the exemplary second stream of fluid can be pressurized air drawn from the outlet 30 of the multi-stage compressor 28 and can be directed by the second fluid injection system 44 along the direction of arrow 22. In the exemplary embodiment, first and second fluid injection systems 20, 44 share a portion of piping or ductwork, represented by arrow 22. As a result, the first and second streams can be a single stream exiting the outlet 30. The first and second streams can be bifurcated by a T-junction 50, the first stream of fluid directed by the T-junction 50 to the portion of the first fluid injection system 20 represented by the arrow 26 and the second stream directed by the T-junction 50 to the portion of the second fluid injection system 44 represented by the arrow 46.

A heat exchanger 52 can be positioned along the portion of the second fluid injection system 44 represented by arrow 46. The heat exchanger 52 can extract heat from the second stream of fluid in the exemplary embodiment of the invention. However, in alternative embodiments, the heat exchanger 52 may be utilized to transfer heat to the second stream of fluid. The basis for utilization of the heat exchanger 52 in the exemplary embodiment of the invention will be described in greater detail below.

The distribution manifold 34 can be part of the second fluid injection system 44 as well as part of the first fluid injection system 20. The second stream of fluid can be directed to a second fluid passageway 54 of the distribution manifold 34 from the portion of the second fluid injection system 44 represented by the arrow 46. The second stream of fluid can exit the second fluid passageway 54 at a second outlet 56 and enter the sump cavity 14.

The arrows 26, 48 represent the flows of the first and second streams of fluid, respectively, entering the sump cavity 14. The outlets 38, 56 can be configured such that the first stream of fluid containing atomized lubricant is directed to the component 10 at a first velocity and the second stream of fluid is directed to the component 10 at a second velocity less than the first velocity. The arrow 26 is illustrated as smaller and narrower than the arrow 48 to further represent that, in the exemplary embodiment of the invention, the first stream of fluid can be relatively more focused or targeted into the sump cavity 14 while the second stream of fluid can be relatively more dispersed.

In the exemplary embodiment of the invention, the first stream of fluid contains atomized lubricant and it can be desirable to impart relatively high momentum to the tiny particles of lubricant in the stream (through higher velocity) in order to increase the likelihood that the tiny particles of lubricant are not diverted away from colliding with the component 10 by other air currents in the sump cavity 14. With respect to the exemplary second stream of fluid, the relatively greater dispersion can enhance thermal management of the component 10. For example, the second stream of fluid can be directed at a relatively slower velocity over a greater area to bathe the component 10 and impart heat to the component or, conversely, absorb heat from the component 10.

In the operation of the first exemplary embodiment of the invention, both of the heat exchangers 32, 52, respectively, can absorb heat from the first and second streams of fluid. It can be desirable to absorb heat from the first stream of fluid to prevent the tiny particles of lubricant from vaporizing in the first stream, rather than vaporizing on the component 10. It can be desirable to absorb heat from the second stream of fluid to increase the cooling effect of the second stream on the component 10. However, the two heat exchangers 32, 52 can be controlled to operate independently from one another. The heat exchangers 32, 52 can be controlled to establish the first and second streams at different temperatures. For example, at the beginning of operation, it can be desirable to heat the component 10 and thereby promote vaporization of the tiny particles of lubricant upon contact with the component 10. For vapor-phase lubrication, it can be desirable to maintain the surface of the component 10 at a temperature of between 600° F. and 900° F. After the component 10 has been operated for a period of time, it can be desirable to cool the component 10 with the second stream. Therefore, the heat exchanger 52 can be inactive at the beginning of operation and activated only after the component 10 has been operated for a period of time. On the other hand, throughout operation, it can be desirable to extract heat from the first stream of fluid.

Figure 2:
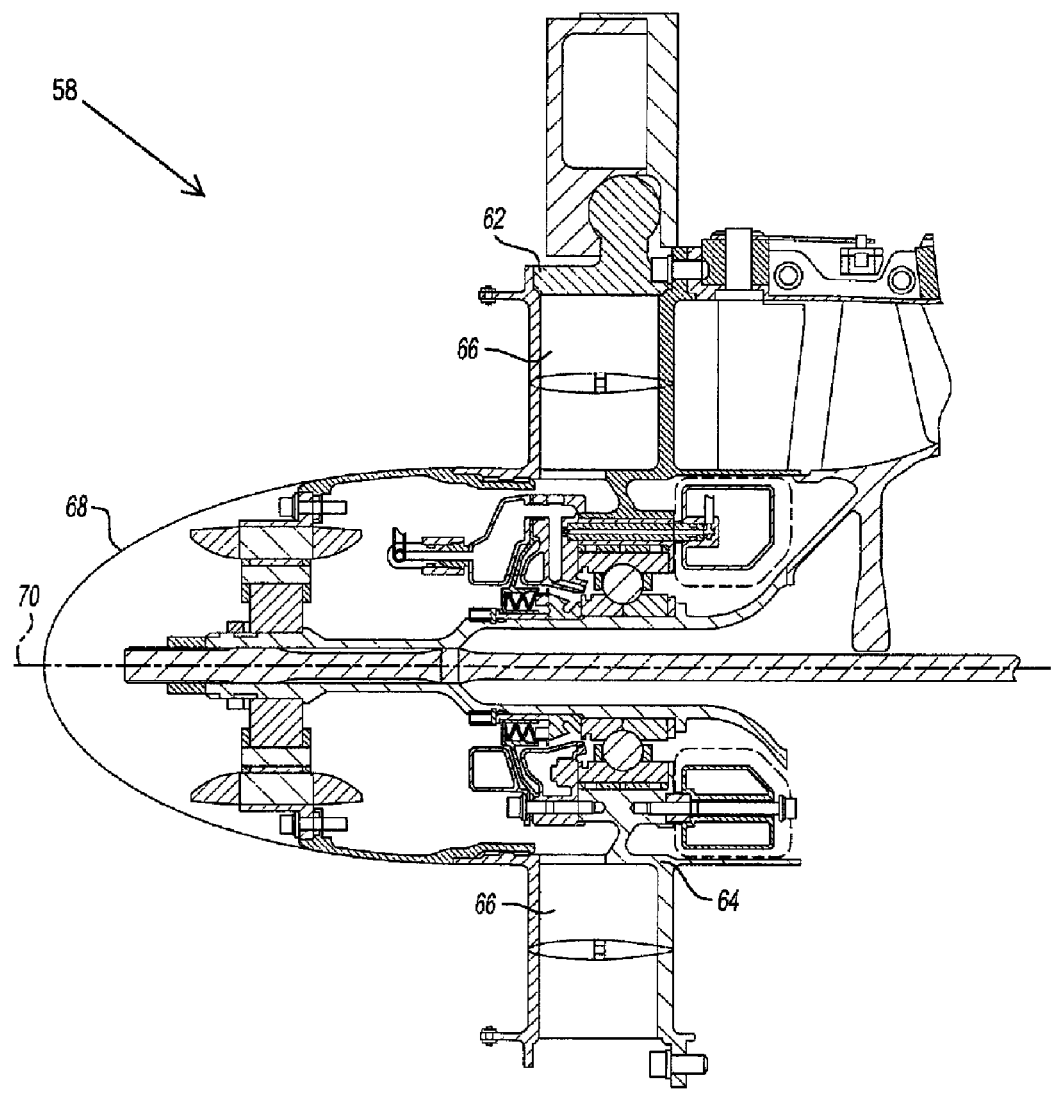
FIG. 2 is a cross-sectional view of a forward end of a turbine engine incorporating the first exemplary embodiment of the invention.

FIGS. 2-6 are detailed views of the first exemplary embodiment described above and shown schematically in FIG. 1. FIG. 2 is a cross-sectional view of a front end 58 of an exemplary turbine engine. The front end 58 can include a front frame member 60 having an outer ring portion 62, an inner ring portion 64, and a plurality of struts 66 connecting the outer and inner ring portions 62, 64 together. A nose cone 68 can be mounted on the front frame member 60. The nose cone 68 and front frame member 60 can be centered on a centerline 70.

Figure 3:
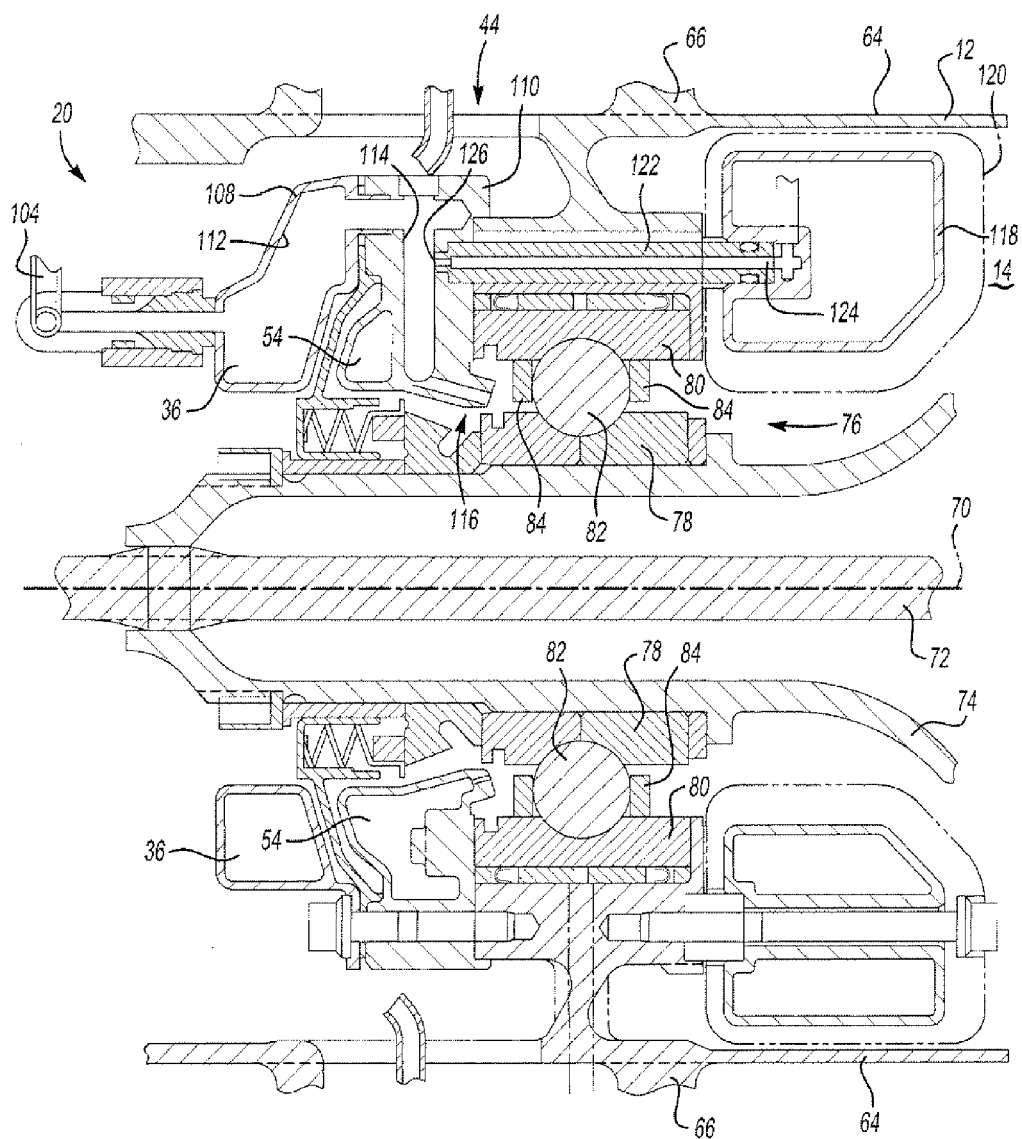
FIG. 3 is an enlarged view of a portion of the first exemplary embodiment of the invention.

FIG. 3 is a magnified portion of FIG. 2. In FIG. 3, a shaft 72 of a turbine engine can be disposed for rotation about the centerline 70. A compressor rotor shaft 74 can encircle the shaft 72 and can also be disposed for rotation about the centerline 70. A bearing 76 can support the shaft 74 in rotation and can include an inner race 78, an outer race 80, a plurality of roller elements 82 positioned between the inner and outer races 78, 80, and a cage 84 capturing the roller elements 82. The inner ring portion 64 of the front frame member 60 can define at least part of the sump 12, the bearing 76 therefore being disposed in the sump cavity 14. The first exemplary embodiment of the invention can deliver first and second streams of fluid to the bearing 76, wherein the first stream can carry atomized lubricant to the bearing 76.

Figure 6:
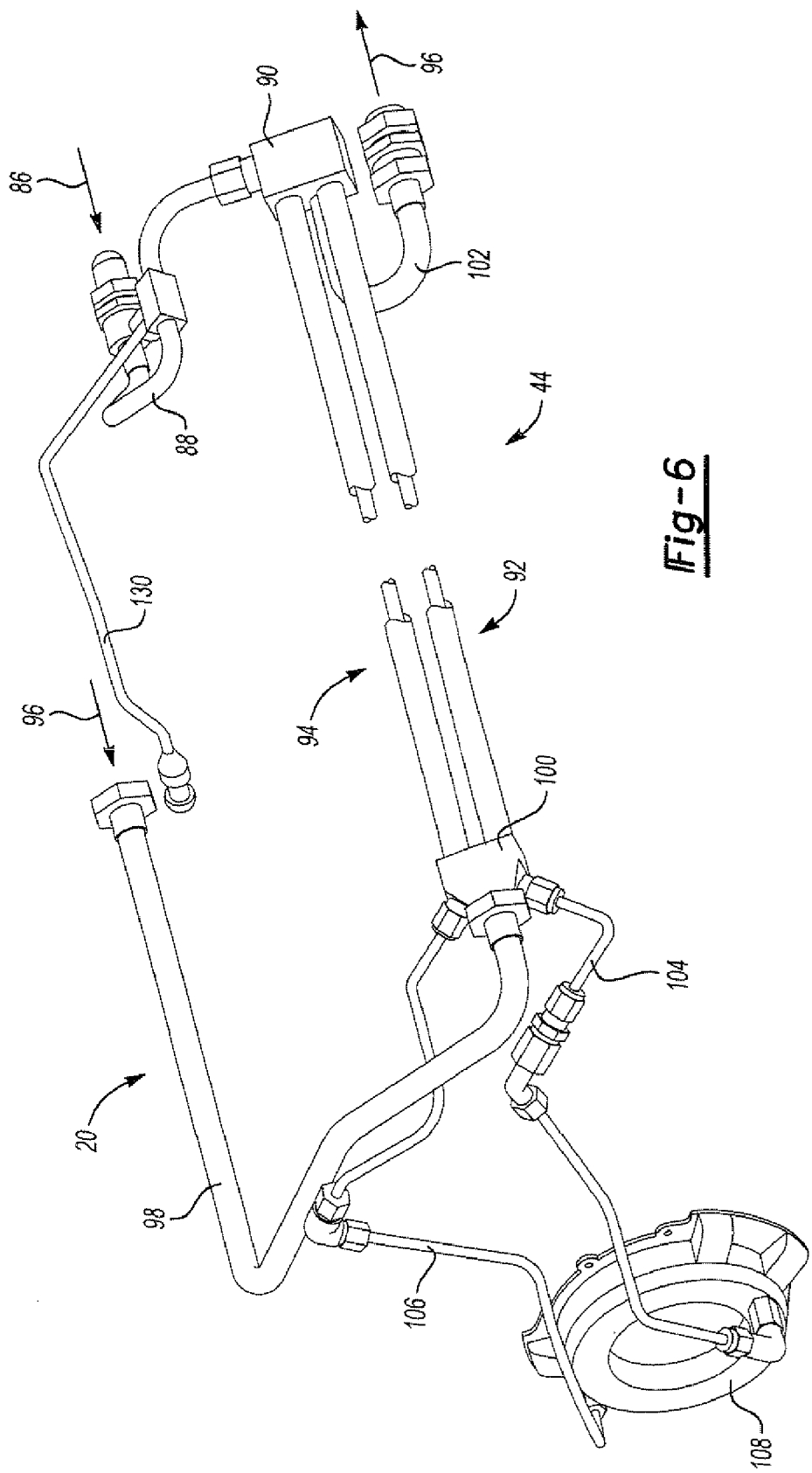
FIG. 6 is a perspective view of fluid conduits for feeding the distribution manifold of the first exemplary embodiment of the invention, wherein other structures of the turbine engine have been omitted to enhance clarity.

Exemplary piping or ductwork is shown in FIG. 6. A flow of pressurized air from an outlet of a multi-stage compressor is represented by arrow 86. The flow of pressurized air can enter a conduit 88 and travel to a T-junction 90. The conduit 88 of FIG. 6 corresponds to the arrow 22 of FIG. 1 and the T-junction 90 corresponds to the T-junction 50 of FIG. 1. The flow of pressurized air can be divided at the T-junction 90 into the first and second streams of fluid. The first stream of fluid can be directed along a conduit 92 (corresponding to arrow 24 of FIG. 1) and the second stream of fluid can be directed along a conduit 94 (corresponding to arrow 46 of FIG. 1). Thus, the first fluid injection system 20 can include the conduits 88 and 92, as well as the T-junction 90. The second fluid injection system 44 can include the conduits 88 and 94, as well as the T-junction 90.

Each of the conduits 92, 94 can be a jacketed tube (tube-in-tube) with a central passageway surrounded by all inner wall and an outer, annular passageway surrounded by an outer wall. The first or second fluid streams can travel along either the inner passageway or the outer passageway of the respective conduit 92, 94. A heat transfer fluid can be directed along the other passageway, enabling the conduits 92, 94 to perform as heat exchangers, such as the heat exchangers 32 and 52 in FIG. 1. For example, a flow of heat transfer fluid represented by arrow 96 can be received in a conduit 98. The heat transfer fluid can be bifurcated at a T-junction 100 and directed through the conduits 92, 94. The bifurcated streams of heat transfer fluid can be rejoined at the T-junction 100 and directed through a conduit 102. The heat transfer fluid can be any fluid available to absorb heat from the first and second streams. One example of a suitable fluid for absorbing heat from the first and second streams in the exemplary embodiment of the engine is engine fuel.

Alter passing through the conduit 92, the first stream of fluid can be received in a conduit 104 and the second stream of fluid can be received in a conduit 106. Thus, the conduit 104 can be part of the first fluid injection system 20 and the conduit 106 can be part of the second fluid injection system 44. Several fittings are shown in FIG. 6 associated with various conduits; these fittings are considered part of the respective conduits unless specifically stated otherwise.

Figure 5:
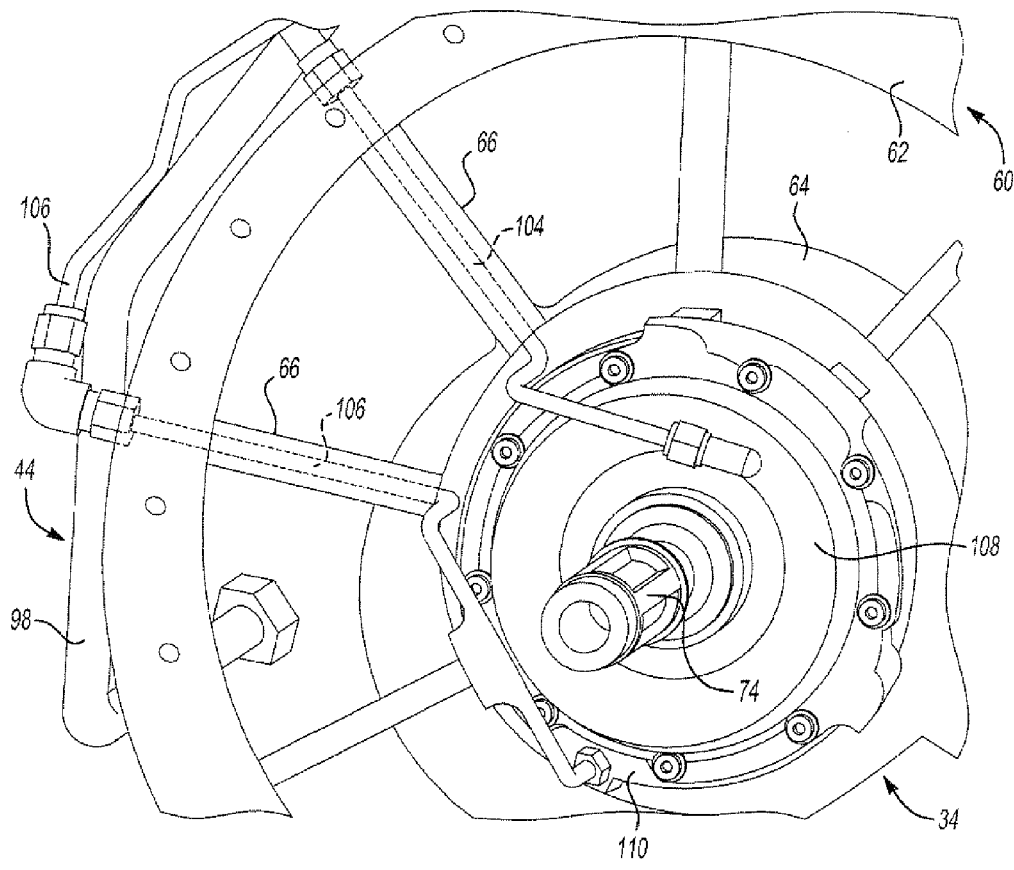
FIG. 5 is a perspective view of the forward end of the turbine engine wherein a nose cone has been removed to better show fluid conduits feeding the distribution manifold of the first exemplary embodiment of the invention.

To enhance clarity, FIG. 6 shows various portions of the first and second fluid injection systems 20, 44 without other structures. FIG. 5 shows the conduits 104, 106 of the first and second fluid injection systems 20, 44, respectively, engaged with the front frame member 60. In FIG. 5, the nose cone 68 and other structures have been removed from the front end 58 of the turbine engine for clarity. The conduit 104 can pass through a strut 66 of the front frame member 60 and communicate with the distribution manifold 34. The conduit 106 can also pass through a strut 66 of the front frame member 60 and communicate with the distribution manifold 34.

Referring again to FIG. 3, the distribution manifold 34 can include a first ring member 108 and a second ring member 110. The first ring member 108 can be part of the first fluid injection system 20 and receive the first stream of fluid from the conduit 104. The second ring member 110 can be part of the second fluid injection system 44 and receive the second stream of fluid from the conduit 106. FIG. 5 best shows the connection between the conduit 106i and the second ring member 110.

The second ring member 110 can also be part of the first fluid injection system 20. As best shown in FIG. 3, the first fluid passageway 36 can be defined in part by an interior surface 112 of the first ring member 108 and also by an interior surface 114 of the second ring member 110. The outlet of the first fluid injection system 20 (outlet 38 in FIG. 1) can be an impingement nozzle 116.

The lubricant injection system 40 is also shown in FIG. 3. The exemplary lubricant injection system 40 can include a tank 118 operable to contain lubricant. The tank 118 can be disposed in the sump cavity 14. A thermal shield (shown by phantom line 120) can be positioned at least partially around the tank 118. A tube 122 can extend between a first end 124 communicating with the tank 118 and a second distal end which can support a misting orifice 126. The misting orifice 126 can communicate directly with the first fluid injection system 20. The tank 118 can be pressurized such that lubricant is urged out of the tank 118 by internal pressure. FIG. 6 shows a conduit 130 branching off from conduit 88. The conduit 130 can deliver pressurized air to the interior of the tank 118. Also, lubricant can be drawn out of the tank 118 by the flow of the first stream of fluid through the first fluid passageway 36 and past the misting orifice 126.

The tank 118 can be located within the sump 12, directly adjacent to the bearing 76. Also, the misting orifice 126 can be positioned outside the tank 118, as close to the impingement nozzle 116 as possible. These aspects of the first exemplary embodiment can be desirable features to enhance the performance of the lubrication system. Specifically, both aspects contribute to the capacity of the first exemplary embodiment to atomizing the lubricant as close as possible to the bearing 76. The length of travel of the atomized lubricant is minimized to the extent possible, given the architecture of the turbine engine. The amount of heat absorbed by the lubricant can be directly related to the distance that the lubricant travels prior to reaching the component to be lubricated. In other words, the greater the distance of travel, the greater the amount of heat that can be absorbed. Extended travel for the atomized lubricant, as required by the prior art, decreases the likelihood that small, liquid phase droplets of liquid are delivered to the bearing 76 for vapor-phase reaction because the heat absorbed during travel could result in vaporization of the droplets prior to contact with the component to be lubricated.

As set forth above, FIG. 5 best shows the connection between the conduit 106 and the second ring member 110. Both the conduit 106 and the second ring member can be part of the second fluid injection system 44. Referring now to FIG. 3, the second ring member 110 of the distribution manifold can define the second fluid passageway 54 for directing the second stream of fluid. The first and second fluid passageways 36, 54 can be isolated from one another.

Figure 4:
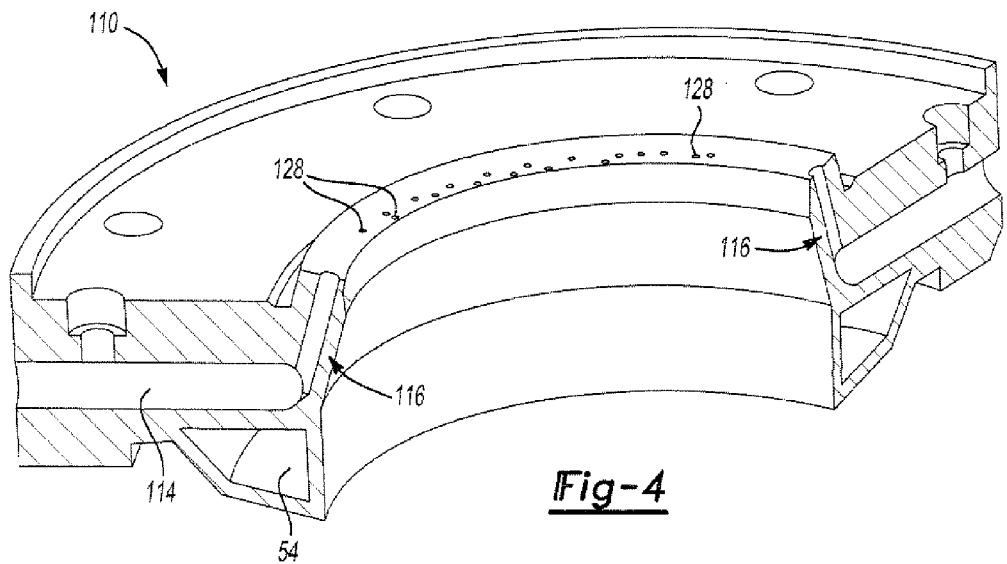
FIG. 4 is a perspective view of a portion of a distribution manifold according to the first exemplary embodiment of the invention.

FIG. 4 shows approximately one-third of the second ring member 110 in perspective view. The second ring member 110 can define the outlets of both of the first and second fluid injection systems. The outlet of the exemplary first fluid injection system (outlet 38 in FIG. 1) can be at least one impingement nozzle 116. The second ring member 110 can define three impingement nozzles 116 (only two nozzles 116 are shown in FIG. 4), evenly spaced from one another about a centerline of the second ring member 110. The outlet of the second fluid injection system (outlet 56 in FIG. 1) can be a plurality of apertures 128 spaced from one another about the centerline of the second ring member 110. As a result of the arrangement of nozzles 116 and apertures 128, the flow of the first stream of fluid can be more concentrated and targeted in the first exemplary embodiment of the invention and the flow of the second stream of fluid can be more dispersed.

Each individual aperture 128 can be smaller than one of the individual impingement nozzles 116 with respect to cross-sectional area. However, the cumulative cross-sectional area of all of the apertures 128 can be greater than the cumulative cross-sectional area of all of the nozzles 116. As a result of this relationship and because both of the first and second fluid streams originate from the same source, the flow of the first stream of fluid can be at a higher velocity than the flow of the second fluid stream. The tiny particles of lubricant in the first stream of fluid can therefore have a relatively greater velocity and higher momentum.

Figure 7:
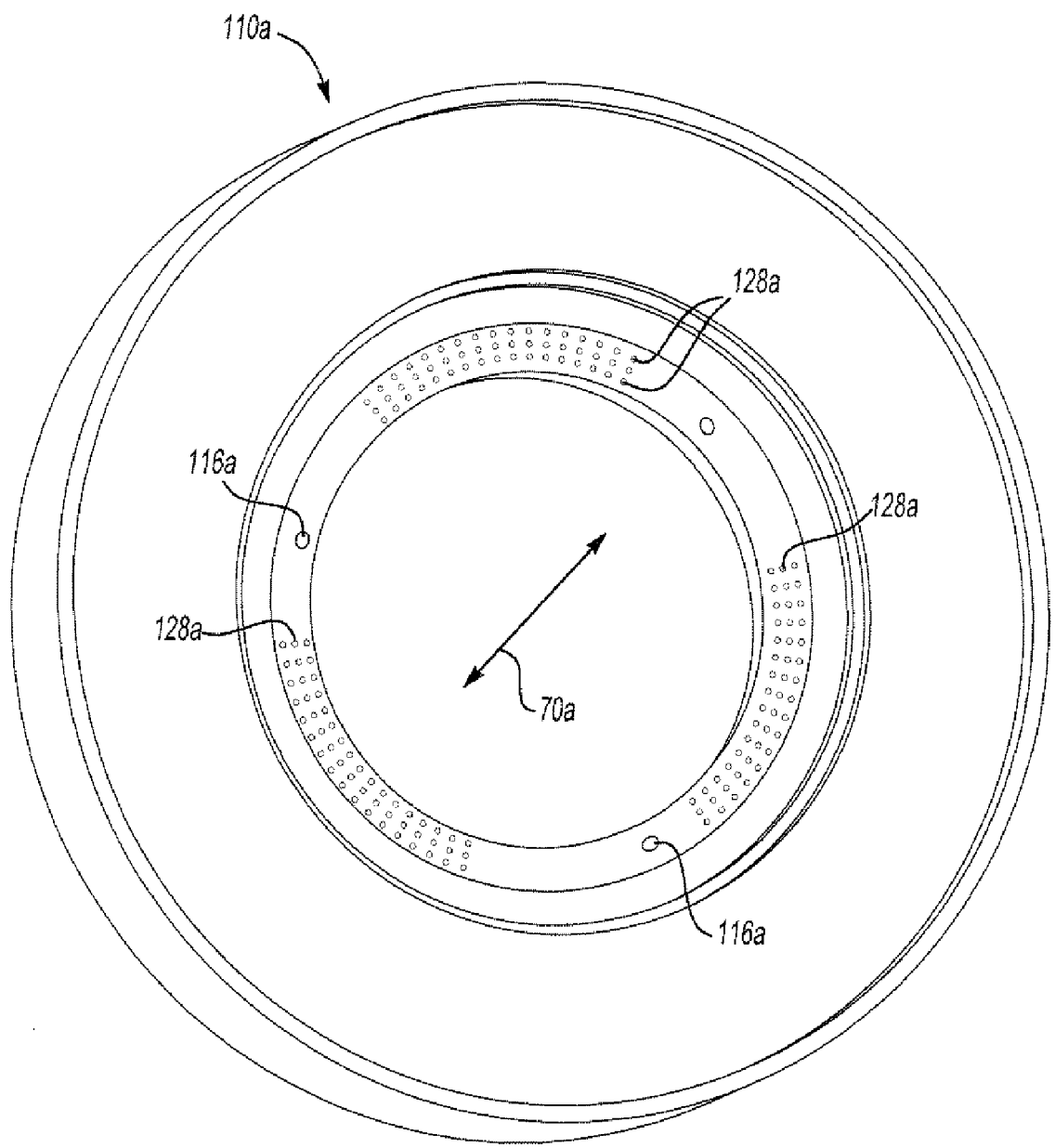
FIG. 7 is a perspective view of a distribution manifold according to a second exemplary embodiment of the invention.

FIG. 7 shows an alternative embodiment of a second ring member 110a. The second ring member 110a can include a plurality of impingement nozzles 116a and a plurality of apertures 128a. In this second embodiment of the second ring member 110a, the apertures 128a can be spaced from one another circumferentially about a centerline 70a and also spaced from one another along the centerline 70a.

Fluid can be drawn from the sump cavity 14 by a vacuum. This can be desirable to urge the flows of the first and second fluid streams across the bearing 76 and also prevent starvation of the bearing 76. FIG. 1 schematically shows an arrow 132 representing a vacuum upon the sump cavity 14, drawn by an inlet 134 of the multi-stage compressor 28.

The first and second streams of fluid can be drawn from different sources. In FIG. 1, a dashed line 136 represents piping or ductwork for drawing the first stream of fluid from an inter-stage portion of the multi-stage compressor 28 instead of the outlet 30. The pressure and temperature of the air passing along line 136 would be less the pressure and temperature of the air exiting the outlet 30. In such an embodiment, it may desirable to change other aspects of the exemplary embodiments described above. For example, a heat exchanger for the first stream of fluid could be obviated or have a reduced capacity. Also, the configuration of the nozzle could be changed to maintain a desired flow velocity out of the impingement nozzle.

In the practicing the various embodiments of the invention, the first and second fluid streams can have the same or different mass flow rates into the sump (without consideration of the mass of lubricant in the first fluid stream). The respective pressures of the first and second fluid streams can be chosen to achieve similar or different mass flow rates for the first and second fluid streams. Also, the cumulative cross-sectional areas of the respective first and second outlets can be varied to achieve similar or different mass flow rates for the first and second fluid streams.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for vapor-phase lubrication of a component comprising the steps of:
   directing a first stream of fluid containing an atomized lubricant to the component at a first velocity; and
   directing a second stream of fluid at a second velocity less than the first velocity to the component for controlling a temperature of the component, both of said directing steps being concurrent.

2. The method of claim 1 further comprising the step of:
   maintaining a surface of the component between 600° F. and 900° F. whereby the lubricant droplets vaporize on contact with the surface of the component.

3. The method of claim 1 further comprising the step of:
   drawing both of the first and second streams from a common source of pressurized fluid.

4. The method of claim 1 wherein said step of directing the first stream of fluid further comprises the steps of:
   generating a flow of fluid with a source of pressurized fluid;
   atomizing a lubricant in the flow of fluid to form the first stream of fluid; and
   cooling the flow of fluid before said atomizing step.

5. The method of claim 4 wherein:
   said step of directing the first stream includes the step of directing the first fluid stream through an impingement nozzle substantially immediately upstream of the component; and
   said atomizing step is further defined as atomizing the lubricant in the flow of fluid to form the first fluid stream substantially immediately upstream of the impingement nozzle.

6. The method of claim 1 further comprising the step of:
   establishing the first and second streams at different temperatures.

7. The method of claim 1 further comprising the step of:
   drawing the first and second streams from different sources of pressurized fluid.

8. The method of claim 1 further comprising the step of:
   applying a pressure differential across the component such that first and second streams move along trajectory in one direction relative to a centerline axis of the component.

9. A lubrication system comprising:
   a sump defining a sump cavity operable to at least partially enclose a component and;
   a first fluid injection system operable to inject a first stream of fluid at a first velocity to said sump cavity;
   a lubricant injection system communicating with said first fluid injection system upstream of said sump cavity and operable to atomize a lubricant in said first stream; and
   a second fluid injection system operable to inject a second stream of fluid at a second velocity less than said first velocity to said sump cavity.

10. The lubrication system of claim 9 wherein said first and second fluid injection systems are further defined as being operable to inject the first and second streams concurrently.

11. The lubrication system of claim 9 further comprising:
    a distribution manifold defining a first fluid passageway with a first inlet and a first outlet for at least partially directing the first stream and also defining a second fluid passageway with a second inlet and a second outlet for at least partially directing the second fluid stream, wherein both of said first and second outlets are directed into said sump cavity.

12. The lubrication system of claim 11 wherein said first outlet is further defined as being smaller than said second outlet whereby the first stream is more concentrated upon entering said sump cavity than the second stream.

13. The lubrication system of claim 11 wherein:
    said first outlet includes at least one aperture to concentrate the first fluid stream into said sump cavity; and said second outlet includes a plurality of apertures spaced from one another to disperse the second fluid stream about said sump cavity, said first outlet having less apertures than said second outlet.

14. The lubricant system of claim 13 further comprising:
wherein said at least one aperture of said first outlet is disposed between two of said plurality of apertures of said second outlet.

15. The lubricant system of claim 9 further comprising:
a heat exchanger in fluid communication with said first fluid injection system and operable to cool the first stream and disposed upstream of said sump.

16. A turbine engine comprising:
a shaft operable to rotate about an axis;
a bearing encircling said shaft and supporting said shaft during rotation about said axis;
a multi-stage compressor disposed along said axis and spaced from said bearing;
a sump defining a sump cavity at least partially enclosing said bearing;
a first fluid injection system operable to inject a first stream of fluid at a first velocity to said bearing, said first fluid injection system drawing fluid for the first stream from said multi-stage compressor section through a first conduit;
a lubricant injection system communicating with said first fluid injection system upstream of said sump cavity and operable to atomize lubricant in said fluid to define said first stream; and
a second fluid injection system operable to inject a second stream of fluid at a second velocity less than said first velocity to said bearing, said second fluid injection system drawing fluid for the second stream from said multi-stage compressor section through a second conduit, wherein said second fluid injection system is configured to control the temperature of said bearing using the second stream.

17. The turbine engine of claim 16 wherein said first and second conduits are both in fluid communication with the same stage of said multi-stage compressor section.

18. The turbine engine of claim 16 wherein said first and second conduits are both in fluid communication with different stages of said multi-stage compressor section.

19. The turbine engine of claim 16 wherein said first and second fluid injection systems are further defined as including a common distribution manifold encircling said shaft in said sump cavity.

20. The turbine engine of claim 19 wherein said distribution manifold includes a first plurality of apertures through which the first stream of fluid passes to reach the bearing and a second plurality of apertures through which the second stream of fluid passes to reach the bearing, wherein said first plurality of apertures are spaced from one another about said axis with at least one of said second plurality of apertures disposed between each of said first plurality of apertures.

* * * * *